May 10, 1949.  A. DINSLEY  2,469,433
METHOD OF SEQUENTIALLY DEPOSITING REACTIVE
SOLUTIONS TO FORM AN INSECTICIDE
Filed Sept. 4, 1945
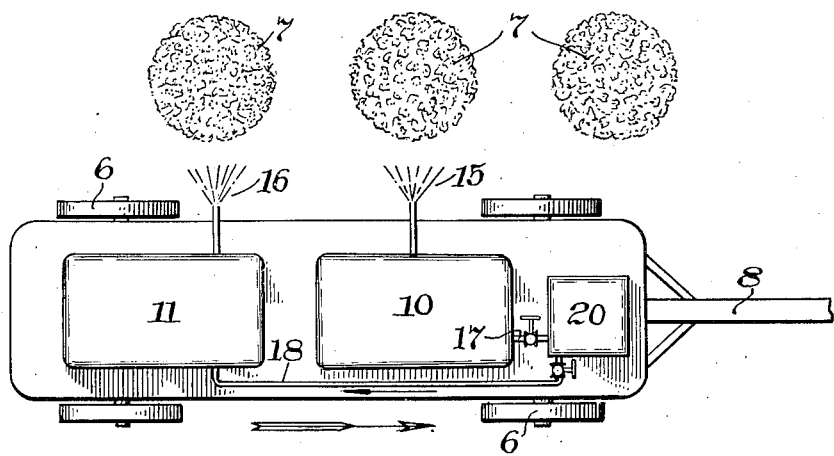
INVENTOR.
Alfred Dinsley,
BY
Attys.

Patented May 10, 1949

2,469,433

UNITED STATES PATENT OFFICE 2,469,433

METHOD OF SEQUENTIALLY DEPOSITING REACTIVE SOLUTIONS TO FORM AN INSECTICIDE

Alfred Dinsley, La Canada, Calif.

Application September 4, 1945, Serial No. 614,425

1 Claim. (Cl. 167—20)

My present invention has to do with a novel preparation for treating trees, plants and the like to kill insects and pests thereon as well as a novel method of applying the material to the plants.

While it is well known that sulphur solutions provide effective insect sprays, the use of conventional solutions possesses certain rather serious shortcomings. The usual or conventional sulphur solution is composed of a sulphur powder admixed with mineral oil, water and soap, which solution is sprayed onto the plants, and must be constantly agitated. Even then an uneven deposit of the sulphur results and also when such a solution is sprayed onto the plants in the sunshine the vegetable tissues of the plants are often destroyed or injured by the corrosive action of the solution.

It is, therefore, an object of my present invention to provide a novel and efficient insecticide which does not require agitation, which kills the insects and parasites on the plants without injuring the plant tissues, which effectively adheres to the plant and is capable of providing an even sulphur coating thereon.

I have found it possible and feasible to accomplish these aims and to overcome the previous difficulties attending the use of sulphur solutions as insecticides, by sequentially spraying onto the plants two separate solutions which, when they come into contact with each other, react to form a deposit of substantially pure sulphur in finely divided form.

In a preferred example of my invention, I first dissolve sodium sulphite ($Na_2SO_3 \cdot 7H_2O$) in water, preferably in an equal amount by weight, to form what I call the primary solution, and then dissolve sodium sulphide ($Na_2S \cdot 9H_2O$) in water, preferably in an equal amount by weight, admixing with the second solution approximately 0.5% by weight of hydrochloric acid, or an equivalent acid capable of decomposing the two solutions. In practice the decomposing acid may be added to either of the solutions. I find that it materially enhances the adhesion and maintains the colloidal nature of the solution by adding to either of the solutions 3% by weight of a gelatine or glucose solution, said gelatin being a refined form of glue.

Such solutions as I have described will, when combined, react to liberate a substantially pure sulphur.

I then apply the two solutions sequentially to the plants preferably by means of a suitable spray apparatus, a diagrammatic showing of which is illustrated in the single figure in the accompanying drawing. By sequentially, I mean that one of the solutions, such as the primary solution, is first sprayed onto the plant, and, before that solution dries, the second solution is sprayed on top of the first deposited solution.

In the drawing, 5 denotes a carriage body mounted on wheels 6 so as to be moved along a row of plants or trees 7, parallel therewith, by any suitable means, such, for instance, as a pull member or tongue 8. Mounted on the carriage body I provide two separate tanks 10, 11, the forward tank 10 being adapted to contain the primary solution and the rear tank 11 being adapted to contain the secondary solution. Each of the tanks has communicating with it a spray element 15, 16, the solutions in the tanks being maintained under pressure through pipes 17, 18, from a conventional compressor 20 on the carriage.

Thus, as the carriage is pulled along parallel with the row of trees or plants the primary solution is first sprayed onto the plants and immediately thereafter, before the deposited primary solution dries, the second solution is sprayed thereon from the following tank 11. After being thus sequentially deposited on the plants the two solutions commence their reaction with each other, eventually liberating a substantially pure sulphur in finely divided form which serves to kill pests, insects and the like without destroying or injuring the plant tissue.

I claim:

The method of applying an insecticide on vegetation which comprises sequentially depositing on said vegetation two aqueous solutions, one of sodium sulphite and the other of sodium sulphide, one of said solutions carrying an acid capable of decomposing the two solutions when admixed and one of said solutions carrying substantially 3% by weight of gelatine solution, said decomposing acid causing the composition to form a deposit of sulphur on the vegetation that is treated and the gelatine solution causing the admixed sulphite and sulphide solutions to spread evenly.

ALFRED DINSLEY.

REFERENCES CITED

The following references are of record in the file of this patent:

UNITED STATES PATENTS

| Number | Name | Date |
| --- | --- | --- |
| 1,532,631 | Molz | Apr. 7, 1925 |
| 1,578,521 | Holton | Mar. 30, 1926 |
| 2,006,895 | Hurt | July 2, 1935 |
| 2,313,190 | Bary | Mar. 9, 1943 |
| 2,363,354 | Peacock | Nov. 21, 1944 |

FOREIGN PATENTS

| Number | Country | Date |
| --- | --- | --- |
| 239,252 | Great Britain | Sept. 17, 1925 |

OTHER REFERENCES

Klatzkin, "Treatment of Scabies," The Pharmaceutical Jour., vol. 93, Aug. 16, 1944, page 64.

Martin, "Scientific Principles of Plant Protection," 2nd ed., 1936, Arnold & Co., London, pages 93, 115, 116, 220, 221.